(12) United States Patent
Kim et al.

(10) Patent No.: US 12,018,126 B2
(45) Date of Patent: Jun. 25, 2024

(54) POLYIMIDE COPOLYMER, METHOD FOR PREPARING THE POLYIMIDE COPOLYMER, PHOTOSENSITIVE RESIN COMPOSITION, PHOTOSENSITIVE RESIN FILM, AND OPTICAL DEVICE USING THE POLYIMIDE COPOLYMER

(71) Applicant: LG CHEM, LTD., Seoul (KR)

(72) Inventors: Bethy Kim, Daejeon (KR); Min Hyung Lee, Daejeon (KR); Young Jee Song, Daejeon (KR); Seongho Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 714 days.

(21) Appl. No.: 17/055,495

(22) PCT Filed: Mar. 11, 2020

(86) PCT No.: PCT/KR2020/003374
§ 371 (c)(1),
(2) Date: Nov. 13, 2020

(87) PCT Pub. No.: WO2020/184972
PCT Pub. Date: Sep. 17, 2020

(65) Prior Publication Data
US 2021/0214500 A1 Jul. 15, 2021

(30) Foreign Application Priority Data
Mar. 13, 2019 (KR) .................. 10-2019-0028863

(51) Int. Cl.
*C08G 73/10* (2006.01)
*C08J 5/18* (2006.01)
*G02B 1/04* (2006.01)

(52) U.S. Cl.
CPC .......... *C08G 73/10* (2013.01); *C08G 73/1042* (2013.01); *C08J 5/18* (2013.01); *G02B 1/04* (2013.01)

(58) Field of Classification Search
CPC ........ C08G 73/10; C08G 73/1042; C08J 5/18; G02B 1/04
(Continued)

(56) References Cited

U.S. PATENT DOCUMENTS

| | | | |
|---|---|---|---|
| 6,686,106 | B2 | 2/2004 | Yasuno et al. |
| 6,875,554 | B2 | 4/2005 | Hatanaka et al. |

(Continued)

FOREIGN PATENT DOCUMENTS

| | | |
|---|---|---|
| JP | 2000-273303 A | 10/2000 |
| JP | 2002-006490 A | 1/2002 |

(Continued)

OTHER PUBLICATIONS

International Search Report issued for International Application No. PCT/KR2020/003374 dated Jun. 30, 2020, 4 pages.
(Continued)

*Primary Examiner* — Ruiyun Zhang
(74) *Attorney, Agent, or Firm* — ROTHWELL, FIGG, ERNST & MANBECK, P.C.

(57) ABSTRACT

The present invention provides a polyimide copolymer containing repeating units having a specific structure derived from monomers synthesized from an epoxy compound, a method for preparing the polyimide copolymer, a photosensitive resin composition, a photosensitive resin film and an optical device including the same.

11 Claims, 1 Drawing Sheet

(58) Field of Classification Search
USPC .......................................................... 428/1.1
See application file for complete search history.

(56) References Cited

U.S. PATENT DOCUMENTS

| | | |
|---|---|---|
| 9,267,004 B2 | 2/2016 | Okada et al. |
| 2012/0118616 A1 | 5/2012 | Saito et al. |

FOREIGN PATENT DOCUMENTS

| | | | |
|---|---|---|---|
| JP | 2011-048329 A | | 3/2011 |
| JP | 2016-172824 A | | 9/2016 |
| KR | 10-2004-0004387 A | | 1/2004 |
| KR | 10-2009-0063543 A | | 6/2009 |
| KR | 10-2011-0018668 A | | 2/2011 |
| KR | 10-2011-0033181 A | | 3/2011 |
| KR | 10-2013-0013202 A | | 2/2013 |
| KR | 10-1431486 B1 | | 8/2014 |
| KR | 10-2014-0144527 A | | 12/2014 |
| KR | 10-2016-0149040 A | | 12/2016 |
| KR | 1020160149040 A | * | 12/2016 |
| TW | I531596 B | | 5/2016 |
| WO | 2019-013182 A1 | | 1/2019 |

OTHER PUBLICATIONS

Que, X. et al., "Synthesis and characterization of trifluoromethyl-containing polyimide-modified epoxy resins", Journal of materials science, 2016, vol. 51-24, pp. 10833-10848.

* cited by examiner

[FIG. 1]
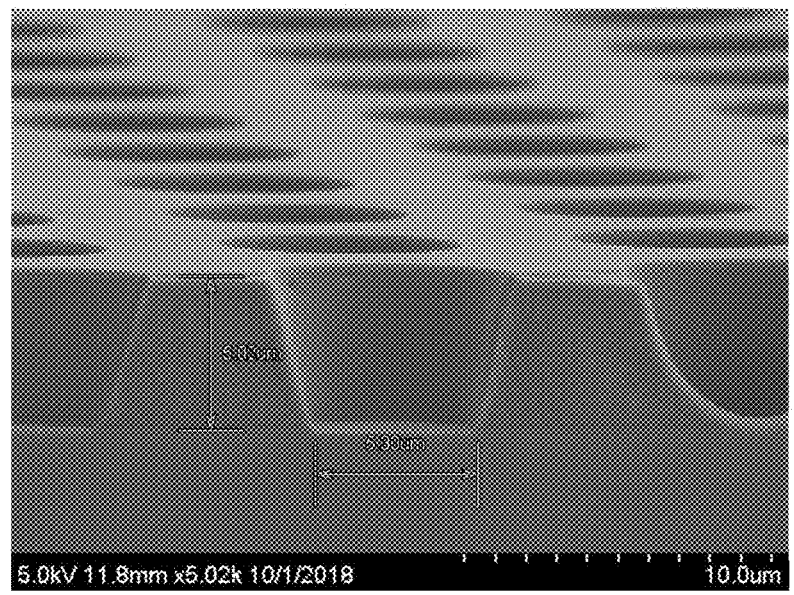
[FIG. 2]
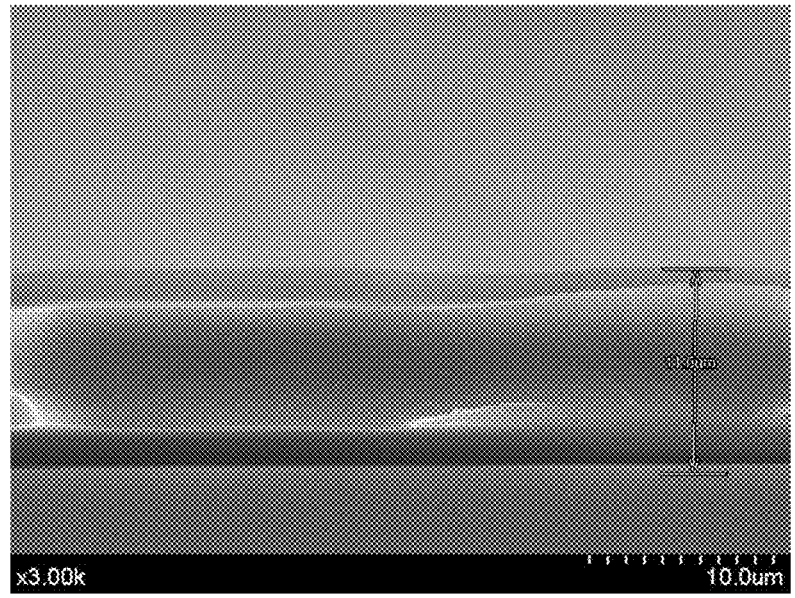

POLYIMIDE COPOLYMER, METHOD FOR PREPARING THE POLYIMIDE COPOLYMER, PHOTOSENSITIVE RESIN COMPOSITION, PHOTOSENSITIVE RESIN FILM, AND OPTICAL DEVICE USING THE POLYIMIDE COPOLYMER

TECHNICAL FIELD

Cross-Reference to Related Application(s)

This application is a 35 U.S.C. 371 National Phase Entry Application from PCT/KR2020/003374 filed on Mar. 11, 2020, designating the United States, which claims the benefit of Korean Patent Application No. 10-2019-0028863 filed on Mar. 13, 2019 with the Korean Intellectual Property Office, the disclosure of which is herein incorporated by reference in its entirety.

The present invention relates to a polyimide copolymer capable of curing at low temperature, having excellent adhesive strength and mechanical properties, and realizing good insulation and pattern properties, a method for preparing the polyimide copolymer, a photosensitive resin composition, a photosensitive resin film and an optical device using the same.

BACKGROUND OF THE INVENTION

Aromatic polyimide resins are polymers mostly having an amorphous structure, and exhibit excellent heat resistance, chemical resistance, electrical properties, and dimensional stability due to their rigid chain structure. These polyimide resins are widely used as materials for electric/electronics.

However, the polyimide resins have many limitations in use because they may appear dark brown in color due to the formation of a charge transfer complex (CTC) of π electrons present in the imide chain, and it is difficult to secure transparency.

In order to solve the above limitations and obtain a colorless transparent polyimide resin, a method of restricting the movement of the π electrons by introducing a strong electron attracting group such as a trifluoromethyl (—$CF_3$) group; a method of reducing the formation of the CTC by introducing a sulfone (—$SO_2$—) group, an ether (—O—) group, or the like into the main chain to make a bent structure; or a method of inhibiting the formation of the resonance structure of the π electrons by introducing an aliphatic cyclic compound, has been proposed.

However, it was difficult for the polyimide resin according to the above proposals to exhibit sufficient heat resistance due to a curved structure or an aliphatic cyclic compound, and a film produced using the same still has limitations in exhibiting poor mechanical properties.

In recent years, to improve the mechanical properties of polyimide, a polyamideimide copolymer in which an amide unit structure is introduced into a polyimde resin has been developed. The amide unit structure imparts large crystallinity to the copolymer, thereby achieving the expression of scratch resistance to the extent to which it can replace glass as a material for display and window covers for various electronic devices.

Accordingly, there is a need to develop a new resin that not only improves the mechanical properties of the polyimide resin, but also improves adhesiveness, insulation property and pattern property for application to various optical devices.

BRIEF SUMMARY OF THE INVENTION

The present invention provides a polyimide copolymer capable of curing at low temperature, having excellent adhesive strength and mechanical properties, and realizing good insulation and pattern properties.

The present invention also provides a method for preparing the polyimide copolymer, a photosensitive resin composition, a photosensitive resin film and an optical device including the same.

The present invention provides a polyimide copolymer comprising: a first repeat unit represented by the following Chemical Formula 1; and a second repeat unit represented by the following Chemical Formula 2:

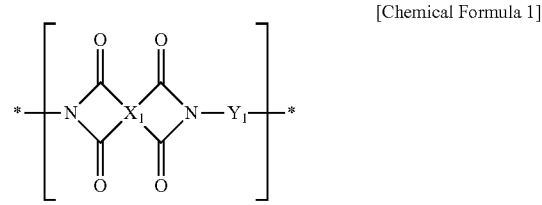

[Chemical Formula 1]

in the Chemical Formula 1, $X_1$ is a tetravalent organic group, and $Y_1$ is an arylene group having 6 to 30 carbon atoms substituted with at least one hydroxy group,

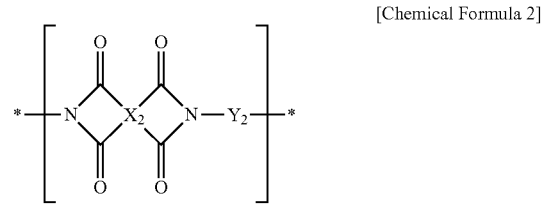

[Chemical Formula 2]

in the Chemical Formula 2, $X_2$ is a tetravalent organic group, and $Y_2$ is a divalent organic group represented by the following Chemical Formula 3,

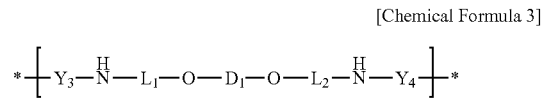

[Chemical Formula 3]

in the Chemical Formula 3, $L_1$ and $L_2$ are each independently an alkylene group having 1 to 10 carbon atoms substituted with at least one hydroxyl group, $D_1$ is a divalent functional group, and $Y_3$ and $Y_4$ are each independently a divalent organic group.

A method for preparing a polyimide copolymer is also provided herein, which method comprises: a first step of reacting an aromatic diamine compound with an aromatic polyfunctional epoxy compound; and a second step of reacting the reaction product of the first step with an aromatic tetracarboxylic acid or anhydride thereof, wherein the reaction product of the first step includes a reaction product of an aromatic diamine compound and an aromatic polyfunctional epoxy compound and a residual amount of an aromatic diamine compound.

A photosensitive resin composition comprising the polyimide copolymer is also provided herein.

A photosensitive resin film comprising a cured product of the photosensitive resin composition is further provided herein.

An optical device comprising the photosensitive resin film is further provided herein.

DETAILED DESCRIPTION OF THE INVENTION

Hereinafter, a polyimide copolymer, a method for preparing the polyimide copolymer, a photosensitive resin composition, a photosensitive resin film and an optical device including the same according to specific embodiments of the invention will be explained in more detail.

Throughout the specification, the following terms may be defined as follows, unless specifically limited.

As used herein, when any part "comprises" any constructional element, it does not mean that other constructional elements are excluded, but it means that other constructional elements can be further included, unless described to the contrary.

In the present specification, examples of the substituents are described below, but are not limited thereto.

As used herein, the term "substitution" means that another functional group bonds instead of a hydrogen atom in the compound, and the substituted position is not limited as long as it is a position where a hydrogen atom is substituted, namely, a substituent can be substituted, and in case substituted with two or more substituents, the two or more substituents may be identical to or different from each other.

As used herein, the term "unsubstituted or substituted" means unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfone amide group; a phosphine oxide group; an alkoxy group; an aryloxy group; an alkyl thioxy group; an aryl thioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents of the above-exemplified substituents are connected. For example, "a substituent in which two or more substituents are connected" may be a biphenyl group. Namely, a biphenyl group may be an aryl group, or it may be interpreted as a substituent in which two phenyl groups are connected.

As used herein, $\xi$, or ⸻ means a bond connected to other substituents, and a direct bond means a case wherein any atom does not exist in a part indicated by L.

In the present specification, an alkyl group is a monovalent functional group derived from alkane, and may be linear or branched. The carbon number of the linear alkyl group is not particularly limited, but preferably 1 to 20. The carbon number of the branched alkyl group is 3 to 20. Specific examples of the alkyl group may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, 2,6-dimethylheptane-4-yl and the like, but are not limited thereto. The alkyl group may be substituted or unsubstituted.

In the present specification, an alkylene group is a divalent functional group derived from alkane, and the above explanations about the alkyl group may be applied thereto, except that it is a divalent functional group. For example, it may be linear or branched, and may be methylene, ethylene, propylene, isobutylene, sec-butylene, tert-butylene, pentylene, hexylene, and the like. The alkylene group may be unsubstituted or substituted.

In the present specification, a haloalkyl group means a functional group in which the above-described alkyl group is substituted by a halogen group, and examples of the halogen group are fluorine, chlorine, bromine or iodine. The haloalkyl group may be substituted or unsubstituted. A specific example of the haloalkyl group may be a trifluoromethyl group ($-CF_3$).

In the present specification, an arylene group is a divalent functional group derived from arene, which may be linear or branched and may be monocyclic or polycyclic. For example, the arylene group may be a phenylene group, a biphenylene group, a terphenylene group, a stilbenylene group, a naphthylenyl group and the like, but is not limited thereto. In addition, one or more hydrogen atoms contained in the arylene group may be respectively substituted with the same substituents as in the case of the above-described alkyl group, for example, one or more aliphatic functional groups having 1 to 20 carbon atoms may be substituted.

In the present specification, a multivalent functional group is a residue in which plural hydrogen atoms bonded to any compound are removed, and for example, a divalent functional group, a trivalent functional group, a tetravalent functional group may be mentioned. For example, a tetravalent functional group derived from amide compound means a residue in which any 4 hydrogen atoms bonded to amide compound are removed.

A direct bond or a single bond means that any atom or atomic group does not exist in corresponding position, and thus, the position is connected by a bond-line. Specifically, it means a case wherein any atom does not exist in a part indicated by $L_1$, or $L_2$ in the Chemical Formulas.

Throughout the specification, weight average molecular weight means weight average molecular weight converted in terms of polystyrene, measured by GPC method. During the process of measuring weight average molecular weight converted in terms of polystyrene measured by GPC, commonly known analysis equipment and detectors such as refractive index detector, and analysis columns may be used, and commonly applied temperature condition, solvent, flow rate may be applied. Specific examples of the measurement conditions are as follows: Polymer Laboratories PLgel MIX-B 300 mm length column and Waters PL-GPC220 device were used, the evaluation temperature was 40° C., 1,2,4-trichlorobenzene was used as a solvent, a flow rate was 1 mL/min, a sample was prepared at a concentration of 10 mg/10 mL and then fed in the amount of 200 μL, and then a calibration curve formed using a polystyrene standard was used, thereby calculating Mw value. As the polystyrene standard, 5 kinds having molecular weight of 2,000/10,000/30,000/70,000/200,000 were used.

I. Polyimide Copolymer

According to one embodiment of the invention, a polyimide copolymer comprising: a first repeat unit represented by the Chemical Formula 1; and a second repeat unit represented by the Chemical Formula 2, can be provided.

The present inventors confirmed through experiments that by using a copolymer containing repeat units having a specific structure derived from a monomer synthesized from an epoxy compound as represented by the Chemical Formula 2, excellent curing performance, adhesion performance and mechanical properties can be realized, the insulation properties of the film obtained by using the copolymer are improved, and it is easy to form positive patterns. Thereby, the present invention was completed.

Specifically, by containing a repeat unit having a specific structure derived from a monomer synthesized from an epoxy compound as represented by the Chemical Formula 2, excellent adhesion to the wiper surface of the non-exposed part is realized by the hydroxyl group, and at the same time, cleaning of the exposed part with an alkaline developer is advantageous, the mechanical properties are improved by the introduction of an alkyl chain, and thus it is possible to realize excellent curing performance, adhesion performance and mechanical properties compared to a polyimide polymer containing only a polyimide unit structure.

In addition, by containing the first repeat unit represented by the Chemical Formula 1 together with the second repeat unit represented by the Chemical Formula 2, the technical effect of simultaneously improving mechanical properties as well as thermal properties of the polyimide can be realized.

In particular, as the repeat unit having a specific structure derived from the monomer synthesized from the epoxy compound is contained in an excessive amount of 60 mol % or more based on the repeat unit contained in the total copolymer, the advantages of the epoxy structure is exhibited without sacrificing the inherent properties of the polyimide, and thus excellent curing performance, adhesion performance and mechanical properties can be realized.

In addition, as the polyimide copolymer containing a repeat unit having a specific structure derived from a monomer synthesized from the epoxy compound contains a large number of crosslinkable functional groups, curing can proceed by inducing crosslinking of the copolymer even at a relatively low temperature, and finally, a cured product having a high crosslinking density can be obtained. Further, during the preparation of the polyimide copolymer, a diamine having an electron attracting group is used and a strong electron attracting group such as a trifluoromethyl (—$CF_3$) group is introduced to restrict the movement of the π electrons present in the imide chain, and thus inhibit the formation of a CTC (charge transfer complex) of π electrons, so that the polyimide copolymer can realize excellent mechanical properties and high elastic properties.

Accordingly, the film containing the cured product of the polyimide copolymer is very excellent in durability and insulation properties, and is thus easily applied to various optical devices.

Specifically, the polyimide copolymer of the one embodiment may include a first repeat unit represented by the Chemical Formula 1; and a second repeat unit represented by the Chemical Formula 2.

In the Chemical Formula 1, $X_1$ is a tetravalent organic group, and $Y_1$ may be an arylene group having 6 to 30 carbon atoms substituted with at least one hydroxy group. In the Chemical Formula 2, $X_2$ is a tetravalent organic group, and $Y_2$ may be a divalent organic group represented by the Chemical Formula 3.

The first repeat unit represented by the Chemical Formula 1 is a repeat unit derived from a reaction product of a tetracarboxylic anhydride and a diamine, the second repeat unit represented by the Chemical Formula 2 is a repeat unit derived from a reaction product of a tetracarboxylic anhydride and a diamine synthesized from an epoxy compound, and in the Chemical Formula 2, $Y_2$ may be a divalent organic group derived from a diamine synthesized from an epoxy compound.

As the polyimide copolymer of the one embodiment includes a second repeat unit represented by the Chemical Formula 2, excellent curing performance, adhesion performance and mechanical properties can be realized, the insulating properties of the film obtained by using the copolymer are improved, and an effect of facilitating the formation of a positive pattern can be realized.

In addition, as the polyimide copolymer of the above one embodiment includes the second repeat unit represented by the Chemical Formula 1 together with the second repeat unit represented by the Chemical Formula 2, technical effects of simultaneously improving mechanical properties as well as thermal properties of the polyimide can be realized.

In the Chemical Formulas 1 to 3, $Y_1$ to $Y_4$ may be a divalent functional group derived from diamine used in the synthesis of the polyimide copolymer.

Further, in the Chemical Formulae 1 to 3, $X_1$ and $X_2$ may be tetravalent functional groups derived from tetracarboxylic dianhydride compounds used in the synthesis of the polyimide copolymer.

Specifically, in the Chemical Formulae 1 to 3, $X_1$ and $X_2$ may each independently be one of tetravalent functional groups represented by the following Chemical Formula 6.

[Chemical Formula 6]

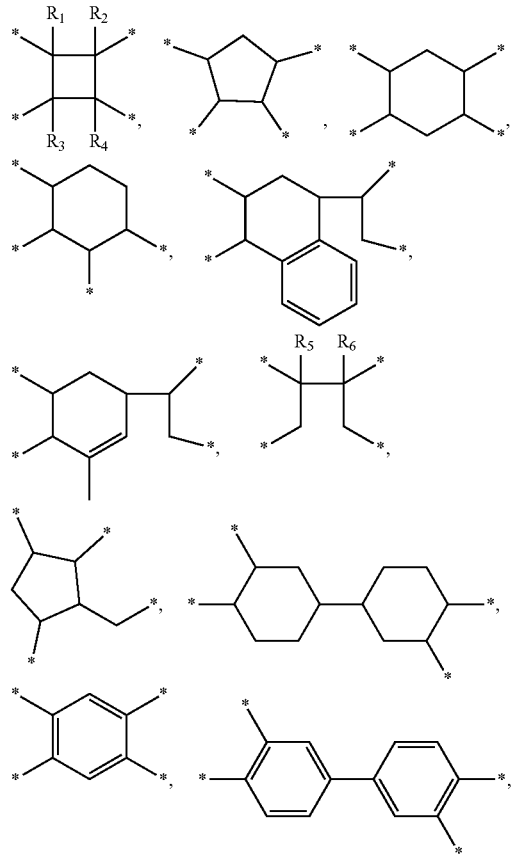

in the Chemical Formula 6, Y is any one of selected from the group consisting of a direct bond, —O—, —CO—, —COO—, —S—, —SO—, —SO$_2$—, —CR$_7$R$_8$—, —(CH$_2$)$_t$—, —O(CH$_2$)$_t$O—, —COO(CH$_2$)$_t$OCO—, —CONH—, phenylene or a combination thereof, where R$_1$ to R$_8$ are each independently hydrogen, an alkyl group or a halo alkyl group having 1 to 10 carbon atoms, and t is an integer of 1 to 10, and t is an integer of 1 to 10.

More preferably, the X$_1$ and X$_2$ are each independently an organic group represented by the following Chemical Formula 6-1 derived from cyclobutane-1,2,3,4-tetracarboxylic dianhydride, an organic group represented by the following Chemical Formula 6-2 derived from 1,3-dimethylcyclobutane-1,2,3,4-tetracarboxylic dianhydride, an organic group represented by the following Chemical Formula 6-3 derived from tetrahydro-[3,3'-bifuran]-2,2', 5,5'-tetraone, an organic group represented by the following Chemical Formula 6-4 derived from 1,2,4,5-cyclohexanetetracarboxylic anhydride, an organic group represented by the following Chemical Formula 6-5 derived from pyromellitic anhydride, an organic group represented by the following Chemical Formula 6-6 derived from 3,3', 4,4'-biphenyltetracarboxylic anhydride, or an organic group represented by the following Chemical Formula 6-7 derived from 4,4'-oxydiphthalic dihydride.

[Chemical Formula 6-1]

[Chemical Formula 6-2]

[Chemical Formula 6-3]

[Chemical Formula 6-4]

[Chemical Formula 6-5]

[Chemical Formula 6-6]

[Chemical Formula 6-7]

In the Chemical Formula 3, L$_1$ and L$_2$ may be functional groups derived from the epoxy group of the epoxy compound. That is, as L$_1$ and L$_2$ are derived from the epoxy group of the epoxy compound, it may include at least one hydroxy group. Specifically, in the Chemical Formula 3, L$_1$ and L$_2$ are each independently an alkylene group having 1 to 10 carbon atoms substituted with at least one hydroxyl group, an alkylene group having 1 to 5 carbon atoms substituted with at least one hydroxy group, or an alkylene group having 1 to 5 carbon atoms substituted with one hydroxy group.

The second repeat unit represented by the Chemical Formula 2 is a repeat unit derived from a reaction product of a tetracarboxylic acid anhydride and a diamine synthesized from an epoxy compound, and by containing a divalent functional group including L$_1$ and L$_2$ containing at least one hydroxy group, the polyimide copolymer containing the second repeat unit represented by the Chemical Formula 2 contains a large number of crosslinkable functional groups, which induces crosslinking of the copolymer even at a relatively low temperature to proceed curing, and finally, a cured product having a high crosslinking density can be provided.

In the Chemical Formula 3, D$_1$ may be a functional group derived from the skeleton of the epoxy compound. In the Chemical Formula 3, D$_1$ may be one of an alkylene group having 1 to 30 carbon atoms; or a divalent functional group represented by the following Chemical Formula 4.

[Chemical Formula 4]

$$*-(-D_2-O-L_3-)_n-O-D_3-*$$

in the Chemical Formula 4, D$_2$ and D$_3$ are each independently an arylene group having 6 to 30 carbon atoms, L$_3$ is an alkylene group having 1 to 10 carbon atoms substituted with at least one hydroxy group, and n is an integer from 1 to 10.

Specifically, in the Chemical Formula 3, D$_1$ may be one of an alkylene group having 1 to 15 carbon atoms; or a divalent functional group represented by the following Chemical Formula 4-1.

[Chemical Formula 4-1]

in the Chemical Formula 4-1, $L_4$ and $L_6$ are each independently any one selected from the group consisting of a direct bond, —O—, —CO—, —COO—, —S—, —SO—, —SO$_2$—, an alkylene group having 1 to 10 carbon atoms, —CONH—, or a combination thereof, $L_5$ is an alkylene group having 1 to 10 carbon atoms substituted with at least one hydroxy group, and n' is an integer from 1 to 10.

More specifically, the divalent functional group represented by the Chemical Formula 4-1 may be a divalent functional group represented by the following Chemical Formula 4-a.

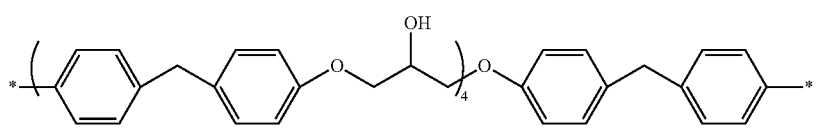

[Chemical Formula 4-a]

In the Chemical Formula 3, $Y_3$ and $Y_4$ may be a divalent functional group derived from the diamine used in the synthesis of the polyimide copolymer.

That is, as the Chemical Formula 3 is a divalent organic group derived from a diamine synthesized from an epoxy compound, the $Y_3$ and $Y_4$ in the Chemical Formula 3 may be a divalent functional group derived from a dia-diamine which has reacted with an epoxy compound.

Specifically, the $Y_3$ and $Y_4$ may be an arylene group having 6 to 30 carbon atoms substituted with at least one electron attracting functional group and at least one hydroxyl group, or an aryl group having 6 to 30 carbon atoms substituted with at least one electron attracting functional group and at least one aliphatic functional group having 1 to 10 carbon atoms including at least one hydroxy groups.

In the polyimide copolymer according to the one embodiment, as $Y_3$ and $Y_4$ include at least one electron attracting functional group, the movement of the π electrons present in the imide chain is restricted by introducing a strong electron attracting functional group such as a trifluoromethyl (—CF$_3$) group, thereby inhibiting the formation of the charge transfer complex (CTC) of the π electrons, so that the polyimide copolymer can realize excellent mechanical properties and high elastic properties.

Specifically, the electron attracting functional group may be one of a perfluoroalkyl having 1 to 10 carbon atoms, such as —F, —Cl, —Br, —I, and —CF$_3$, a perchloroalkyl having 1 to 10 carbon atoms such as —CCl$_3$, a perbromoalkyl having 1 to 10 carbon atoms, such as —CBr$_3$, a periodoalkyl having 1 to 10 carbon atoms such as —CI$_3$, —NO$_2$, —CN, —COCH$_3$, or —CO$_2$C$_2$H$_5$.

Further, in the polyimide copolymer according to the one embodiment, as the $Y_3$ and $Y_4$ include at least one hydroxy group, a number of crosslinkable functional groups are contained in the polyimide copolymer, which induces crosslinking of the copolymer even at a relatively low temperature to proceed curing, and eventually, a cured product having a high crosslinking density can be provided.

In the Chemical Formula 3, $Y_3$ and $Y_4$ are not particularly limited, but may be, for example, a divalent functional group represented by the following Chemical Formula 10.

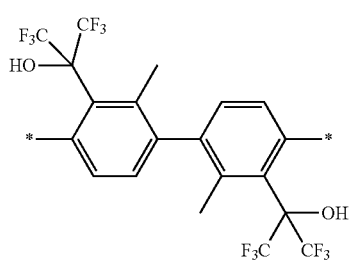

[Chemical Formula 10]

In the polyimide copolymer according to one embodiment, the second repeat unit represented by the Chemical Formula 2 can be contained in an amount of 60 mol % or more, 60 mol % or more and less than 100 mol %, 60 mol % or more and 95 mol % or less, or 70 mol % or more and 95 mol % or less, based on the total repeat units contained in the polyimide copolymer.

As the second repeat unit represented by the Chemical Formula 2 is contained in an amount of 60 mol % or more based on the total repeat units contained in the polyimide copolymer, excellent curing performance, adhesive performance and mechanical properties can be achieved.

When the second repeat unit represented by the Chemical Formula 2 is contained in an amount of less than 60 mol % based on the total repeat units contained in the polyimide copolymer, the viscosity increases which may cause a technical problem that curing performance, adhesion performance and mechanical properties are reduced.

A weight average molecular weight of the polyimide copolymer may be 5,000 g/mol or more and 30,000 g/mol or less, or 5,000 g/mol or more and 20,000 g/mol or less, or 8,000 g/mol or more and 20,000 g/mol or less, or 8,000 g/mol or more and 15,000 or less.

Thereby, the polymerization reaction of the polyimide copolymer can be stably performed, and sufficient mechanical properties can be secured. When the molecular weight of the polyimide copolymer is excessively reduced, it is difficult for the film produced therefrom to secure sufficient mechanical properties or adhesiveness, and when the molecular weight of the copolymer is excessively increased, the modulus or crystallinity of the polyimide copolymer is excessively increased, and thus, it may be difficult to secure the desired elasticity or elastic recovery ratio.

II. Method for Producing Polyimide Copolymer

According to one embodiment of the present invention, there can be provided a method for producing a polyimide copolymer comprising the step of: reacting an amine monomer mixture including a diamine compound containing an arylene group having 6 to 30 carbon atoms substituted with at least one hydroxy group and a diamine compound containing a divalent organic group represented by the following Chemical Formula 13; and an aromatic tetracarboxylic acid or an anhydride thereof.

[Chemical Formula 13]

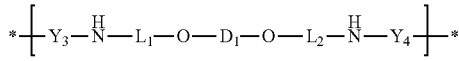

in the Chemical Formula 13, $L_1$ and $L_2$ are each independently an alkylene group having 1 to 10 carbon atoms substituted with at least one hydroxyl group, $D_1$ is a divalent functional group, and $Y_3$ and $Y_4$ are each independently a divalent organic group.

Specifically, in accordance with the method for preparing the polyimide copolymer of the present invention, the polyimide copolymer of the above-mentioned one embodiment can be prepared.

Specifically, the amine monomer mixture may include a diamine compound containing an arylene group having 6 to 30 carbon atoms substituted with at least one hydroxy group and a diamine compound containing a divalent organic group represented by the Chemical Formula 13.

The method for preparing the polyimide copolymer of the above-mentioned one embodiment further comprises the step of reacting an aromatic diamine compound with an aromatic polyfunctional epoxy compound of the following Chemical Formula 7 to form a diamine compound containing a divalent organic group represented by the Chemical Formula 13.

[Chemical Formula 7]

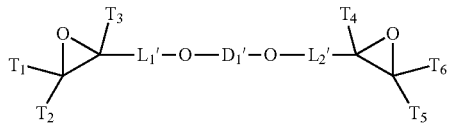

in the Chemical Formula 7, $L_1'$ and $L_2'$ are each independently an alkylene group having 1 to 10 carbon atoms, $D_1'$ is a divalent functional group, $T_1$ to $T_6$ are each independently hydrogen, an alkyl group having 1 to 10 carbon atoms, a haloalkyl group having 1 to 10 carbon atoms, or an aryl group having 6 to 30 carbon atoms.

That is, the diamine compound containing a divalent organic group represented by the Chemical Formula 13 may be a reaction product of an aromatic diamine compound and an aromatic polyfunctional epoxy compound of the Chemical Formula 7.

Specifically, in the Chemical Formula 7, $D_1'$ may be one of an alkylene group having 1 to 30 carbon atoms; or a divalent functional group represented by the following Chemical Formula 4.

[Chemical Formula 4]

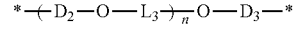

in the Chemical Formula 4, $D_2$ and $D_3$ are each independently an arylene group having 6 to 30 carbon atoms, $L_3$ is an alkylene group having 1 to 10 carbon atoms substituted with at least one hydroxy group, and n is an integer from 1 to 10.

Specifically, in the Chemical Formula 7, $D_1'$ may be one of an alkylene group having 1 to 15 carbon atoms; or a divalent functional group represented by the following Chemical Formula 4-1.

[Chemical Formula 4-1]

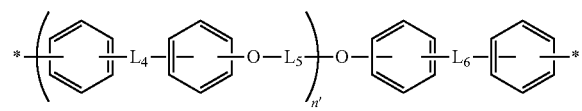

in the Chemical Formula 4-1, $L_4$ and $L_6$ are each independently any one selected from the group consisting of a direct bond, —O—, —CO—, —COO—, —S—, —SO—, —SO$_2$—, an alkylene group having 1 to 10 carbon atoms, —CONH—, or a combination thereof, $L_5$ is an alkylene group having 1 to 10 carbon atoms substituted with at least one hydroxy group, and n' is an integer from 1 to 10.

More specifically, the divalent functional group represented by the Chemical Formula 4-1 may be a divalent functional group represented by the following Chemical Formula 4-a.

[Chemical Formula 4-a]

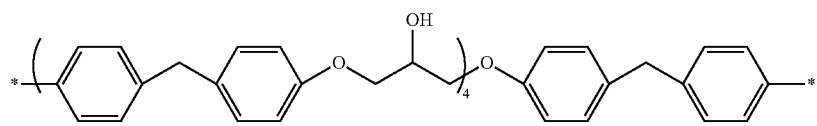

The aromatic diamine compound may include a compound represented by the following Chemical Formula 8.

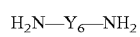 [Chemical Formula 8]

in the Chemical Formula 8, $Y_6$ is an arylene group having 6 to 30 carbon atoms substituted with at least one electron attracting functional group and at least one hydroxyl group, or an arylene group having 6 to 30 carbon atoms substituted with at least one electron attracting functional group and at least one aliphatic functional group having 1 to 10 carbon atoms including at least one hydroxyl group.

Specifically, the electron attracting functional group may be one of a perfluoroalkyl having 1 to 10 carbon atoms, such as —F, —Cl, —Br, —I, and —$CF_3$, a perchloroalkyl having 1 to 10 carbon atoms such as —$CCl_3$, a perbromoalkyl having 1 to 10 carbon atoms such as —$CBr_3$, a periodoalkyl having 1 to 10 carbon atoms such as —$CI_3$, —$NO_2$, —CN, —$COCH_3$, or —$CO_2C_2H_5$.

In the Chemical Formula 8, $Y_6$ is not particularly limited, but may be, for example, a diamine represented by the following Chemical Formula 11.

[Chemical Formula 11]

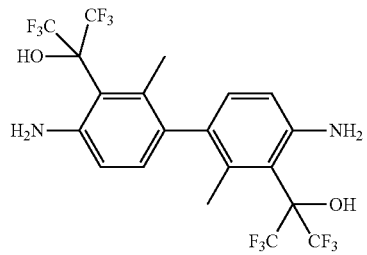

The aromatic diamine compound may be added in an excessive amount with respect to the aromatic polyfunctional epoxy compound of the Chemical Formula 7. Specifically, the aromatic polyfunctional epoxy compound of the Chemical Formula 7 may be added in an amount of less than 0.5 mol, or 0.01 mol or more and less than 0.5 mol, or 0.1 mol or more and less than 0.5 mol, or 0.3 mol or more and 0.49 mol or less, and 0.4 mol or more and 0.49 mol or less with respect to 1 mol of the aromatic diamine compound.

When the aromatic polyfunctional epoxy compound of the Chemical Formula 7 is added and reacted in an amount of less than 0.5 mol with respect to 1 mol of the aromatic diamine compound, a relatively excessive amount of the aromatic diamine compound is added and thereby, two epoxy groups present in the aromatic polyfunctional epoxy compound of the Chemical Formula 7 each can react with the amino group of the aromatic diamine compound to synthesize a diamine compound containing a divalent organic group represented by the Chemical Formula 13.

When the aromatic polyfunctional epoxy compound of the Chemical Formula 7 is added in an amount of 0.5 mol or more with respect to 1 mol of the aromatic diamine compound, it is difficult to sufficiently proceed conversion to a new diamine compound, and thus, it is difficult to form a diamine compound containing a divalent organic group represented by the Chemical Formula 13, such as a monomer of the polyimide copolymer of the one embodiment.

Subsequently, an amine monomer mixture of the diamine compound containing a divalent organic group represented by the Chemical Formula 13 and a diamine compound containing an arylene group having 6 to 30 carbon atoms substituted with at least one hydroxy group reacts with an aromatic tetracarboxylic acid or an anhydride thereof to form a polyimide copolymer.

Specifically, the diamine compound containing a divalent organic group represented by the Chemical Formula 13 may include a compound represented by the Chemical Formula 9.

[Chemical Formula 9]

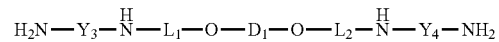

in the Chemical Formula 9, $L_1$ and $L_2$ are each independently an alkylene group having 1 to 10 carbon atoms substituted with at least one hydroxy group, $D_1$ is a divalent functional group, and $Y_3$ and $Y_4$ are each independently an arylene group having 6 to 30 carbon atoms substituted with at least one electron attracting functional group and at least one hydroxyl group, or an arylene group having 6 to 30 carbon atoms substituted with at least one electron attracting functional group and at least one aliphatic functional group having 1 to 10 carbon atoms including at least one hydroxyl group.

Specifically, in the Chemical Formula 9, $D_1$ may be one of an alkylene group having 1 to 15 carbon atoms; or a divalent functional group represented by the Chemical; Formula 4-1.

In addition, in the Chemical Formula 9, $Y_3$ and $Y_4$ may be a divalent functional group derived from the aromatic diamine compound.

Specifically, the $Y_3$ and $Y_4$ may be an arylene group having 6 to 30 carbon atoms substituted with at least one electron attracting functional group and at least one hydroxyl group, or an arylene group having 6 to 30 carbon atoms substituted with at least one electron attracting functional group and at least one aliphatic functional groups having 1 to 10 carbon atoms including at least one hydroxyl group.

Specifically, the electron attracting functional group may be one of a perfluoroalkyl having 1 to 10 carbon atoms, such as —F, —Cl, —Br, —I, and —$CF^3$, a perchloroalkyl having 1 to 10 carbon atoms such as —$CCl_3$, a perbromoalkyl having 1 to 10 carbon atoms such as —$CBr_3$, a periodoalkyl having 1 to 10 carbon atoms such as —$CI_3$, —$NO_2$, —CN, —$COCH_3$, or —$CO_2C_2H_5$.

In the Chemical Formula 9, $Y_3$ and $Y_4$ are not particularly limited, but may be, for example, a divalent functional group represented by the following Chemical Formula 10.

[Chemical Formula 10]

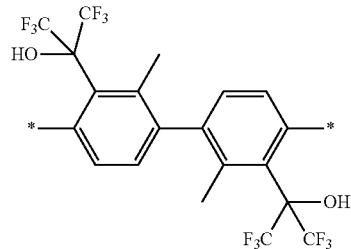

The reaction time of all reactions of the method for preparing the polyimide copolymer can be adjusted within a range of 0.1 to 20 hours.

Meanwhile, the step of reacting an amine monomer mixture comprising a diamine compound containing an arylene group having 6 to 30 carbon atoms substituted with the at least one hydroxy group and a diamine compound containing a divalent organic group represented by the following Chemical Formula 13; and an aromatic tetracarboxylic acid or an anhydride thereof may be performed at a temperature of 150° C. or higher.

In the amine monomer mixture, the diamine compound having a divalent organic group represented by the Chemical Formula 13 may be included in a ratio of 2 mol or more and 20 mol or less, 2 mol or more and 15 mol or less, or 2.5 mol or more and 15 mol or less with respect to 1 mol of the diamine compound containing an arylene group having 6 to 30 carbon atoms substituted with the at least one hydroxy group.

As each diamine compound is included in the amine monomer mixture to satisfy the above range, the polyimide copolymer prepared according to the one embodiment of the present invention can realize excellent chemical resistance.

Examples of the aromatic tetracarboxylic acid or the anhydride thereof are not particularly limited, but tetracarboxylic dianhydride is preferred, specifically, 4,4'-oxydiphthalic anhydride, pyromellitic dianhydride, or the like can be used.

The all reactions of the method for preparing the polyimide copolymer may be performed in the presence of an organic solvent. Specific examples of the organic solvent include toluene, tetrahydrofuran, N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monoethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, diethylene glycol methyl ethyl ether and the like. They can be used alone or in combination of two or more.

III. Photosensitive Resin Composition

According to another embodiment of the present invention, a photosensitive resin composition comprising the polyimide copolymer of one embodiment can be provided. The details of the polyimide copolymer may include all the contents described above in the one embodiment.

And, the photosensitive resin composition may be one in which the polyimide copolymer of one embodiment is dissolved or dispersed in an organic solvent. Specific examples of the organic solvent include toluene, tetrahydrofuran, N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N—dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether; ethylene glycol monoisopropyl ether acetate, ethylene glycol monobutyl ether, ethylene glycol monobutyl ether acetate, diethylene glycol methyl ethyl ether and the like. They can be used alone or in combination of two or more.

The solid content of the photosensitive resin composition may be 10% by weight or more and 50% by weight or less, or 20% by weight or more and 40% by weight or less, or 25% by weight or more and 35% by weight or less based the total weight of the photosensitive resin composition.

In addition, the photosensitive resin composition may further include other components in addition to the polyimide copolymer of one embodiment and the organic solvent. In a non-limiting example, when the photosensitive resin composition is coated, additives capable of improving the uniformity of the thickness of a film and the surface smoothness, or improving the adhesion between a film and a substrate, or changing the dielectric constant and conductivity of a film, or increasing the denseness of a film, may be further included. Examples of these additives include various kinds of solvents, coloring materials, inorganic fillers, surfactants, silane-based compounds, dielectrics or crosslinking compounds, and the like. The addition amount thereof is not particularly limited, and can be freely adjusted within the range of 0.1% by weight or more and 50% by weight or less based on the total weight of the photosensitive resin composition.

The specific use of the photosensitive resin composition is not limited, but for example, can be used for a photoresist sheet, an alignment film, an adhesive, an insulation layer, a color filter for display devices, a black matrix for display devices, a column spacer for display devices, a photocurable paint, a photocurable ink, and the like.

IV. Photosensitive Resin Film

According to another embodiment of the present invention, a photosensitive resin film comprising a cured product of the photosensitive resin composition of the other embodiment can be provided. Specifically, the cured product means a material obtained through a curing process of the photosensitive resin composition of the other embodiment. In the curing step of the photosensitive resin composition, the crosslinking reaction of the polyimide copolymer of one embodiment is proceeded. That is, the cured product of the photosensitive resin composition of the other embodiment may include a crosslinked product of the polyimide copolymer of the one embodiment.

The heat-curing temperature of the photosensitive resin film may be 250° C. or less, 180° C. to 250° C., or 190° C. to 220° C. Specifically, the crosslinking functional group contained in the polyimide block of the polyimide copolymer of the one embodiment may proceed a crosslinking reaction at a temperature of 250° C. or less, 180° C. to 250° C., or 190° C. to 220° C.

Thus, as the thermal deformation of the polyimide copolymer in the film or the thermal deformation of the film in the film forming process is minimized, a uniform shape and numerical value can be stably secured together with excellent physical properties in the finally obtained photosensitive resin film.

The thickness of the photosensitive resin film is not particularly limited, but can be freely adjusted within the range of, for example, 0.001 μm to 100 μm. When the thickness of the photosensitive resin film increases or decreases by a specific value, the physical properties measured by the photosensitive resin film can also change by a certain value.

Meanwhile, the photosensitive resin film may include an opening pattern. The opening pattern refers to a photosensitive resin film having micropores (holes) having a maximum diameter of 100 μm or less, and the micropores may be formed through selective exposure and development processes of the photosensitive resin film.

When the photosensitive resin film includes an opening pattern, it may become a connection channel (via hole) with another film when it is applied to an electronic device, an optical device, etc., and thus, it can be used as an insulating film or the like.

Examples of the method of producing the photosensitive resin film is not particularly limited, but for example, the method may include the steps of coating the photosensitive resin film of the other embodiment onto a substrate to form a coating film (step 1); drying the coating film (step 2); and heat-treating and curing the dried coating film (step 3).

The step 1 is a step of coating the above-described photosensitive resin composition onto a substrate to form a coating film. The details of the photosensitive resin composition include all the contents described above in the other embodiment.

The method of coating the photosensitive resin composition onto the substrate is not particularly limited, but for example, methods such as spin coating, screen printing, offset printing, flexographic printing, inkjet, and the like can be used. A silicon wafer can be mentioned as an example of the substrate.

The step 2 is a step of drying the coating film formed by coating the photosensitive resin composition onto a substrate. The step of drying the coating film may be performed by a heating means such as a hot plate, a hot air circulating oven, an infrared oven, and the like, and the drying may be performed at a temperature of 50° C. to 150° C., or 100° C. to 150° C.

The step 3 is a step of heat-treating and curing the dried coating film. At this time, the heat treatment may be performed by a heating means such as a hot plate, a hot air circulating oven, an infrared oven, and the like, and the heat treatment may be performed at a temperature of 180° C. to 250° C., or 190° C. to 220° C. In the case of the photosensitive resin composition containing the polyimide copolymer of the one embodiment, as the curing temperature by the heat treatment proceeds at a relatively low temperature of 250° C. or less, the thermal deformation of the copolymer is minimized and thus, a uniform shape and a numerical value can be stably secured together with excellent physical properties in the finally obtained film.

Meanwhile, if necessary, the method may further include exposing and developing the dried coating film prior to the step 3. The opening pattern can be formed on the dried film through the exposure and development steps.

Example of the method of exposing the coating film is not particularly limited, but for example, selective exposure can be performed through methods such as: contacting a photomask having a predetermined pattern formed on the coating film and irradiating ultraviolet light, or imaging a predetermined pattern contained in the mask through a projection objective lens and then irradiating ultraviolet light, or direct imaging using a laser diode as a light source and then irradiating ultraviolet light. At this time, as an example of ultraviolet irradiation conditions, irradiating with a light quantity of 5 mJ/cm$^2$ to 600 mJ/cm$^2$ may be mentioned.

As an example of the method of developing the coating film, a method of treating an alkaline developer may be mentioned. Examples of the alkaline developer are not particularly limited, but for example, it can be used by adjusting the concentration and temperature of an aqueous alkaline solution such as potassium hydroxide, sodium hydroxide, sodium carbonate, potassium carbonate, sodium phosphate, sodium silicate, ammonia, tetramethylammonium hydroxide, amines and the like, and a commercially available alkaline developer can also be used.

The specific amount of the alkaline developer used is not particularly limited, but it is necessary to adjust the concentration and the time so as not to damage the coating film, and the developing can be performed in a 2.38 wt % tetramethylammonium hydroxide aqueous solution for 150 seconds.

V. Optical Device

According to still another embodiment of the present invention, an optical device including the photosensitive resin film of the other embodiment can be provided.

The photosensitive resin film may be introduced into an optical device, an electric device, or the like by a known method. The photosensitive resin film is produced from the polyimide copolymer of the one embodiment and can realize excellent stability together with excellent physical properties. Thus, an optical device capable of exhibiting high reliability can be provided.

Advantageous Effects

According to the present invention, a polyimide copolymer capable of curing at low temperature, having excellent adhesive strength and mechanical properties, and realizing good insulation and pattern properties, a method for preparing the polyimide copolymer, a photosensitive resin composition, a photosensitive resin film and an optical device including the same can be provided.

BRIEF DESCRIPTION OF DRAWINGS

FIG. 1 is a photograph of the photoresist pattern of Example 1 taken with a scanning electron microscope.

FIG. 2 is a photograph of the photoresist pattern of Comparative Example 1 taken with a scanning electron microscope.

DETAILED DESCRIPTION OF THE EMBODIMENTS

Hereinafter, preferred examples are presented to assist in understanding of the invention. However, the following examples are presented only as the illustrations of the present invention, and the contents of the present invention are not limited thereby.

Examples, Comparative Examples and Reference Examples: Preparation of Polyimide Copolymer Example 1

(1) Synthesis of Polyimide Copolymer

A 250 mL flask equipped with a Dean-Stark apparatus was prepared, in which 2,2'-(4,4'-diamino-2,2'-dimethyl-[1,1'-biphenyl]-3,3'-diyl)bis(1,1,1,3,3,3-hexafluoropropan-2-ol) (25 g, 0.048 mmol) as a first diamine was dissolved in NMP, and then YDF-170 (3.8 g, 0.023 mmol) was reacted at 170° C. for 2 hours under a nitrogen environment to synthesize a compound represented by the following Chemical Formula a as a second diamine.

[YDF-170]

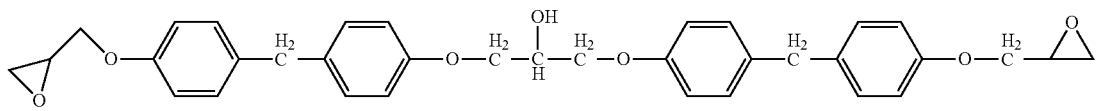

[Chemical Formula a]

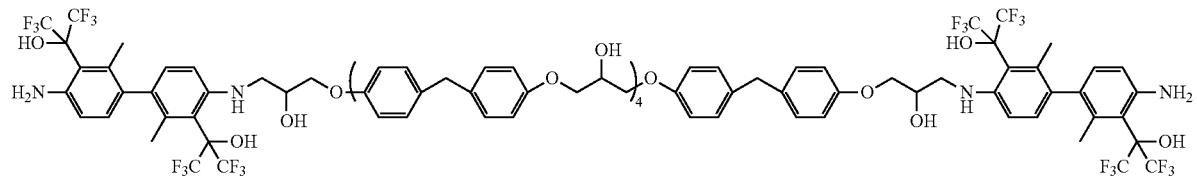

In the solution on which the reaction was completed, a mixture of the residual amount 0.002 mmol of the first diamine and 0.023 mmol of the second diamine was contained as an amine monomer mixture.

Thereafter, the solution was cooled to 0° C., and then 4,4'-oxydiphthalic anhydride (15 g, 0.048 mmol) was added, and NMP was added so that the solid content became 35 wt %. Thereafter, 1 eq of each of pyridine and acetic anhydride catalysts were added, and then the mixture was reacted at 70° C. for 2 hours to synthesize a polyimide copolymer (P-1). The molecular weight of the polyimide copolymer (P-1) was measured by GPC using a THF solvent, and as a result, it was found to be a number average molecular weight Mn=9000 g/mol and a weight average molecular weight Mw=13000 g/mol.

(2) Preparation of Photosensitive Resin Composition 1 eq of each of the polyimide copolymer (P-1), pyridine and acetic anhydride catalyst were dissolved in diethylene glycol methyl ethyl ether (MEDG) to obtain a photosensitive resin composition.

Example 2

A polyimide copolymer (P-2) and a photosensitive resin composition were obtained in the same manner as in Example 1, except that in Example 1, 1,4-bis (oxiran-2-ylmethoxy)butane (4.9 g, 0.02 mmol) was added instead of YDF-170, a compound represented by the following Chemical Formula b was synthesized as the second diamine instead of a compound represented by the Chemical Formula a, and a mixture of the residual amount 0.008 mmol of the first diamine and 0.02 mmol of the second diamine were included in the amine monomer mixture.

[Chemical Formula b]

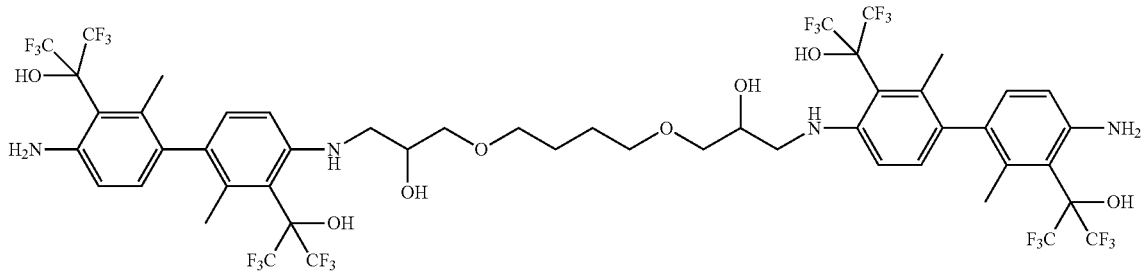

The molecular weight of the polyimide copolymer (P-2) was measured by GPC using a THF solvent, and as a result, it was found to be a number average molecular weight Mn=9000 g/mol and a weight average molecular weight Mw=14000 g/mol.

Example 3

A polyimide copolymer (P-3) and a photosensitive resin composition were obtained in the same manner as in Example 1, except that in Example 1, 2,2'-(((2,2-dimethyl-propane-1,3-diyl)bis(oxy))bis(methylene))bis(oxirane) (5.3 g, 0.02 mmol) was added instead of YDF-170, a compound represented by the following Chemical Formula c was synthesized as the second diamine instead of a compound represented by the Chemical Formula a, and a mixture of the residual amount 0.008 mmol of the first diamine and 0.02 mmol of the second diamine were included in the amine monomer mixture.

[Chemical Formula c]

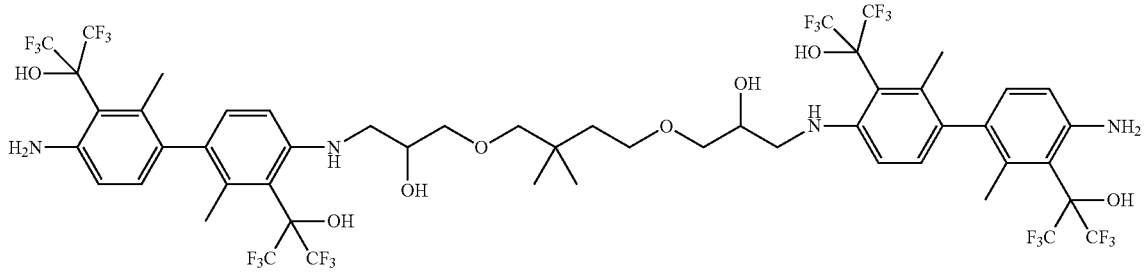

The molecular weight of the polyimide copolymer (P-3) was measured by GPC using a THF solvent, and as a result, it was found to be a number average molecular weight Mn=5000 g/mol and a weight average molecular weight Mw=10000 g/mol.

Comparative Example

Comparative Example 1

A 250 mL flask equipped with a Dean-Stark apparatus was prepared, in which 2,2'-(4,4'-diamino-2,2'-dimethyl-[1,1'-biphenyl]-3,3'-diyl)bis(1,1,1,3,3,3-hexafluoropropan-2-ol) (25 g, 0.048 mmol) as a first diamine and 4,4'-oxydiphthalic anhydride (15 g, 0.048 mmol) were dissolved in NMP so that the solid content became 35 wt %, and then reacted at 0° C. for 12 hours. Thereafter, 1 eq of each of pyridine and acetic anhydride catalysts were added, and then the mixture was reacted at 70° C. for 2 hours to synthesize a polyimide copolymer (R-1).

After the reaction was completed, a photosensitive resin composition in which the polyimide copolymer (R-1) was dissolved in diethylene glycol methyl ethyl ether (MEDG) was obtained. The molecular weight of the polyimide copolymer (R-1) was measured by GPC using a THF solvent, and as a result, it was found to be a number average molecular weight Mn=22000 g/mol and a weight average molecular weight Mw=32000 g/mol.

Comparative Example 2

A polyimide copolymer (R-2) and a photosensitive resin composition were obtained in the same manner as in Example 1, except that in Example 1, YDF-170 was added in an amount of 0.024 mmol, so that the residual amount of the first diamine was not present in the amine monomer mixture, and only 0.024 mmol of the second diamine was included.

Comparative Example 3

A photosensitive resin composition was obtained in the same manner as in Comparative Example 1, except that in Comparative Example 1, YDF-170 (3.8 g, 0.023 mmol) was further added as an additive to the photosensitive resin composition on which the copolymer preparation was completed.

Reference Example 1

A polyimide copolymer (R-3) and a photosensitive resin composition were obtained in the same manner as in Example 1, except that in Example 1, YDF-170 was added in an amount of 0.016 mmol, so that a mixture of the residual amount 0.016 mmol of the first diamine and 0.016 mmol of the second diamine was included in the amine monomer mixture.

Reference Example 2

A polyimide copolymer (R-4) and a photosensitive resin composition were obtained in the same manner as in Example 1, except that in Example 1, YDF-170 was added in an amount of 0.012 mmol, so that a mixture of the residual amount 0.024 mmol of the first diamine and 0.012 mmol of the second diamine was included in the amine monomer mixture.

TABLE 1

| Category | Diamine | Epoxy compound | Molar ratio of residual amount of first diamine:second diamine | Content of repeat unit derived from second diamine derivative (mol %) | Weight average molecular weight of copolymer (g/mol) |
|---|---|---|---|---|---|
| Example 1 | DA1 | YDF-170 | 1:11.5 | 92 | 13000 |
| Example 2 | DA1 | E1 | 1:2.5 | 71.4 | 14000 |
| Example 3 | DA1 | E2 | 1:2.5 | 71.4 | 10000 |
| Comparative Example 1 | DA1 | — | 1:0 | 0 | 32000 |
| Comparative Example 2 | DA1 | YDF-170 | 0:1 | 100 | 12000 |
| Comparative Example 3 | DA1 | YDF-170 | 1:0 | 0 | 22000 |
| Reference Example 1 | DA1 | YDF-170 | 1:1 | 50 | 23000 |
| Reference Example 2 | DA1 | YDF-170 | 1:0.5 | 33.3 | 21000 |

\* DA1: 2,2'-(4,4'-diamino-2,2'-dimethyl-[1,1'-biphenyl]-3,3'-diyl)bis (1,1,1,3,3,3-hexafluoropropan-2-ol)
\*E1: 1,4-bis(oxiran-2-ylmethoxy)butane
\*E2: 2,2'-(((2,2-dimethylpropane-1,3-diyl)bis(oxy))bis(methylene))bis(oxirane)
\* The residual amount of the first diamine refers to the residual amount of the first diamine that remains unreacted after the reaction between the first diamine and the epoxy compound was completed, and the second diamine means a diamine synthesized by the reaction of the epoxy compound and the first diamine.
\* The content of the repeat unit derived from the second diamine: mole number (%) of repeat units derived from the second diamine with respect to the total repeating units of the polyimide copolymer Experimental Example Preparation of Photoresist Pattern The photosensitive resin compositions obtained in Examples and Comparative Examples above was coated onto a 4-inch silicon wafer using a spin coating method at 1000 rpm, and then dried at a temperature of 20° C. for 2 minutes to obtain a substrate on which a photosensitive resin film having a thickness of 5.0 μm was formed.

The substrate was exposed to an energy of 220 mJ/cm² by a broadband aligner exposure apparatus using a mask having a fine pattern formed thereon. Thereafter, the exposed substrate was developed in a 2.38 wt % tetramethylammonium hydroxide aqueous solution for 150 seconds, washed with ultrapure water, and then dried under nitrogen to form a pattern on the photosensitive resin film. Then, the resultant was cured again at a temperature of 200° C. for 2 hours to obtain a substrate on which a patterned photosensitive resin film was formed.

Experimental Example 1: Chemical Resistance

The substrate on which a photosensitive resin film was formed was immersed in a solvent selected from NMP (N-Methyl-2-pyrrolidone), PEDGE (poly(ethylene glycol) diglycidyl ether), CPO(cyclopentanone), IPA (isopropanol), 2.38% TMAH(tetramethylammonium hydroxide), and 10% MSA(methyl sulfonic acid) for 30 minutes, then washed with isopropyl alcohol and dried under nitrogen. Then, the surface condition of the patterned photosensitive resin film was grasped through a microscope, and the chemical resistance was evaluated under the following criteria, and the results are shown in Table 2 below.

Excellent: There are no damages like melted marks or cracks.

Defective: There are damages such as melted marks or cracks

TABLE 2

| Category | Chemical Resistance | | | | | |
|---|---|---|---|---|---|---|
| | NMP | PEDGE | CPO | IPA | 2.38% TMAH | 10% MSA |
| Example 1 | Excellent | Excellent | Excellent | Excellent | Excellent | Excellent |
| Example 2 | Defective | Excellent | Excellent | Excellent | Excellent | Excellent |
| Example 3 | Excellent | Excellent | Defective | Excellent | Excellent | Excellent |
| Comparative Example 1 | Defective | Defective | Defective | Excellent | Excellent | Excellent |
| Comparative Example 2 | Defective | Defective | Defective | Excellent | Excellent | Excellent |
| Comparative Example 3 | Defective | Defective | Defective | Excellent | Excellent | Excellent |
| Reference Example 1 | Defective | Defective | Defective | Defective | Excellent | Excellent |
| Reference Example 2 | Defective | Defective | Defective | Defective | Excellent | Excellent |

As shown in Table 2, the photosensitive resin film obtained from the copolymers of Examples 1 to 3 containing a specific content of repeat units derived from a diamine monomer synthesized from an epoxy compound exhibited excellent chemical resistance to most solvents.

On the other hand, the photosensitive resin film obtained from the copolymers of Comparative Examples 1 to 3 that does not contain the repeat units derived from a diamine monomer synthesized from an epoxy compound or contains only repeat units derived from a diamine monomer synthesized from an epoxy compound exhibited defective chemical resistance to solvents of NMP, PEDGE, and CPO as compared with Examples.

In addition, the photosensitive resin film obtained from the copolymers of Reference Examples 1 and 2 containing less than 60 mol % of repeat units derived from the diamine monomer synthesized from the epoxy compound exhibited defective chemical resistance to solvents of NMP, PEDGE, CPO, and IPA as compared with Examples.

Experimental Example 2: Pattern Developability

Photographs taken with a scanning electron microscope with respect to the photoresist patterns of the photosensitive resin compositions of Example 1 and Comparative Example 1 are shown in FIGS. 1 and 2, respectively.

FIG. 1 is a photograph of the photoresist pattern of Example 1 taken with a scanning electron microscope. FIG. 2 is a photograph of the photoresist pattern of Comparative Example 1 taken with a scanning electron microscope. According to FIGS. 1 and 2, the photoresist pattern using the photoresist composition of Example 1 was confirmed to have excellent developability. On the other hand, the photoresist pattern using the photoresist composition of Comparative Example 1 containing no imide repeat unit derived from the epoxy-containing monomer was confirmed that the developability was degraded and pattern formation was impossible.

The invention claimed is:

1. A polyimide copolymer comprising:
a first repeat unit represented by Chemical Formula 1; and
a second repeat unit represented by Chemical Formula 2:

[Chemical Formula 1]

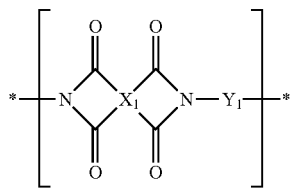

in the Chemical Formula 1,
$X_1$ is a tetravalent organic group, and
$Y_1$ is an arylene group having 6 to 30 carbon atoms substituted with at least one hydroxy group,

[Chemical Formula 2]

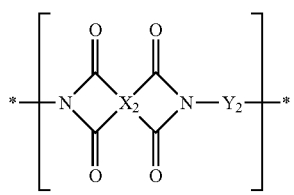

in the Chemical Formula 2,
$X_2$ is a tetravalent organic group,
and $Y_2$ is a divalent organic group represented by Chemical Formula 3,

[Chemical Formula 3]

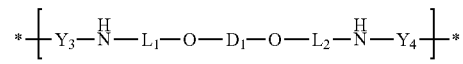

in the Chemical Formula 3,
$L_1$ and $L_2$ are each independently an alkylene group having 1 to 10 carbon atoms substituted with at least one hydroxyl group,
$D_1$ is a divalent functional group, and
$Y_3$ and $Y_4$ are each independently a divalent organic group,
wherein the second repeat unit represented by the Chemical Formula 2 is contained in an amount of 60 mol % or more based on the total repeat units contained in the polyimide copolymer.

2. The polyimide copolymer according to claim 1, wherein $D_1$ is an alkylene group having 1 to 30 carbon atoms; or a divalent functional group represented by Chemical Formula 4,

[Chemical Formula 4]

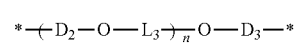

in the Chemical Formula 4,
$D_2$ and $D_3$ are each independently an arylene group having 6 to 30 carbon atoms,
$L_3$ is an alkylene group having 1 to 10 carbon atoms substituted with at least one hydroxy group, and
n is an integer from 1 to 10.

3. The polyimide copolymer according to claim 1, wherein $D_1$ is an alkylene group having 1 to 15 carbon atoms; or a divalent functional group represented by Chemical Formula 4-1

[Chemical Formula 4-1]

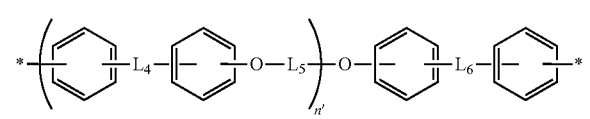

in the Chemical Formula 4-1,
$L_4$ and $L_6$ are each independently any one selected from the group consisting of a direct bond, —O—, —CO—, —COO—, —S—, —SO—, —SO$_2$—, an alkylene group having 1 to 10 carbon atoms, —CONH—, and a combination thereof,
$L_5$ is an alkylene group having 1 to 10 carbon atoms substituted with at least one hydroxy group, and
n' is an integer from 1 to 10.

4. The polyimide copolymer according to claim 1, wherein the $Y_3$ and $Y_4$ are an arylene group having 6 to 30 carbon atoms substituted with at least one electron-attracting functional group and at least one hydroxyl group, or an arylene group having 6 to 30 carbon atoms substituted with at least one aliphatic function group having 1 to 10 carbon atoms including at least one electron-attracting functional group and at least one hydroxy group.

5. The polyimide copolymer according to claim 1, wherein the $X_1$ and $X_2$ are each independently one of tetravalent functional groups represented by Chemical Formula 6,

[Chemical Formula 6]

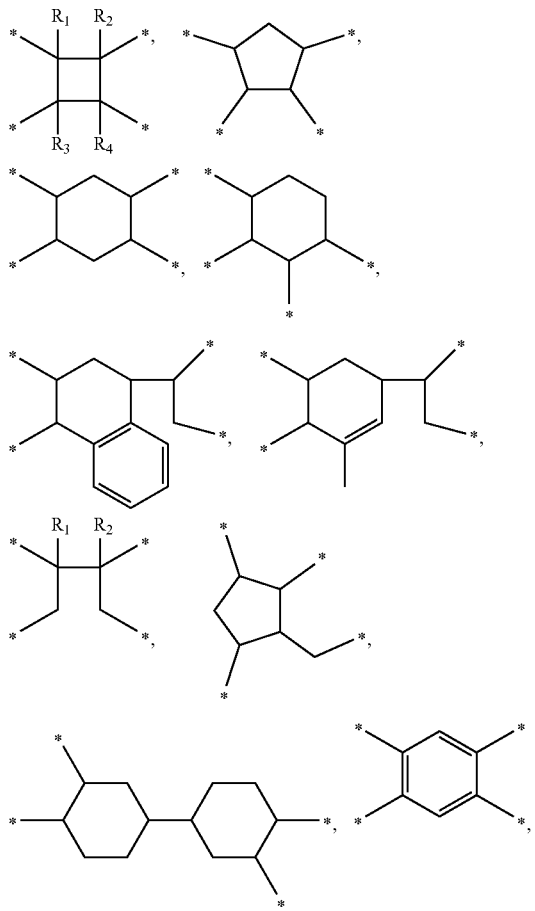

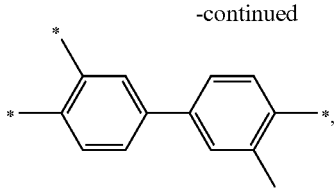

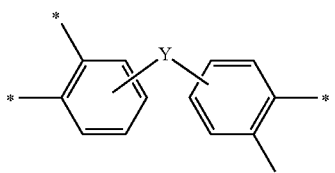

in the Chemical Formula 6,

Y is any one selected from the group consisting of a direct bond, —O—, —CO—, —COO—, —S—, —SO—, —SO$_2$—, —CR$_7$R$_8$—, —(CH$_2$)$_t$—, —O(CH$_2$)$_t$O—, —COO(CH$_2$)$_t$OCO—, —CONH—, phenylene and a combination thereof, where $R_1$ to $R_8$ are each independently hydrogen, or an alkyl group or a halo alkyl group having 1 to 10 carbon atoms, and t is an integer of 1 to 10.

6. The polyimide copolymer according to claim 1, wherein a weight average molecular weight of the polyimide copolymer is 5,000 g/mol or more and 30,000 g/mol or less.

7. A photosensitive resin composition comprising the polyimide copolymer of claim 1.

8. A photosensitive resin film comprising a cured product of the photosensitive resin composition of claim 7.

9. The photosensitive resin film according to claim 8, wherein a heat-curing temperature of the photosensitive resin composition is 250° C. or less.

10. An optical device comprising the photosensitive resin film of claim 8.

11. The polyimide copolymer according to claim 4, wherein the electron-attracting functional group is at least one group selected from the group consisting of a perfluoroalkyl having 1 to 10 carbon atoms, a perchloroalkyl having 1 to 10 carbon atoms, a perbromoalkyl having 1 to 10 carbon atoms, a periodoalkyl having 1 to 10 carbon atoms, —NO$_2$, —CN, —COCH$_3$, and —CO$_2$C$_2$H$_5$.

\* \* \* \* \*